Figure 3:
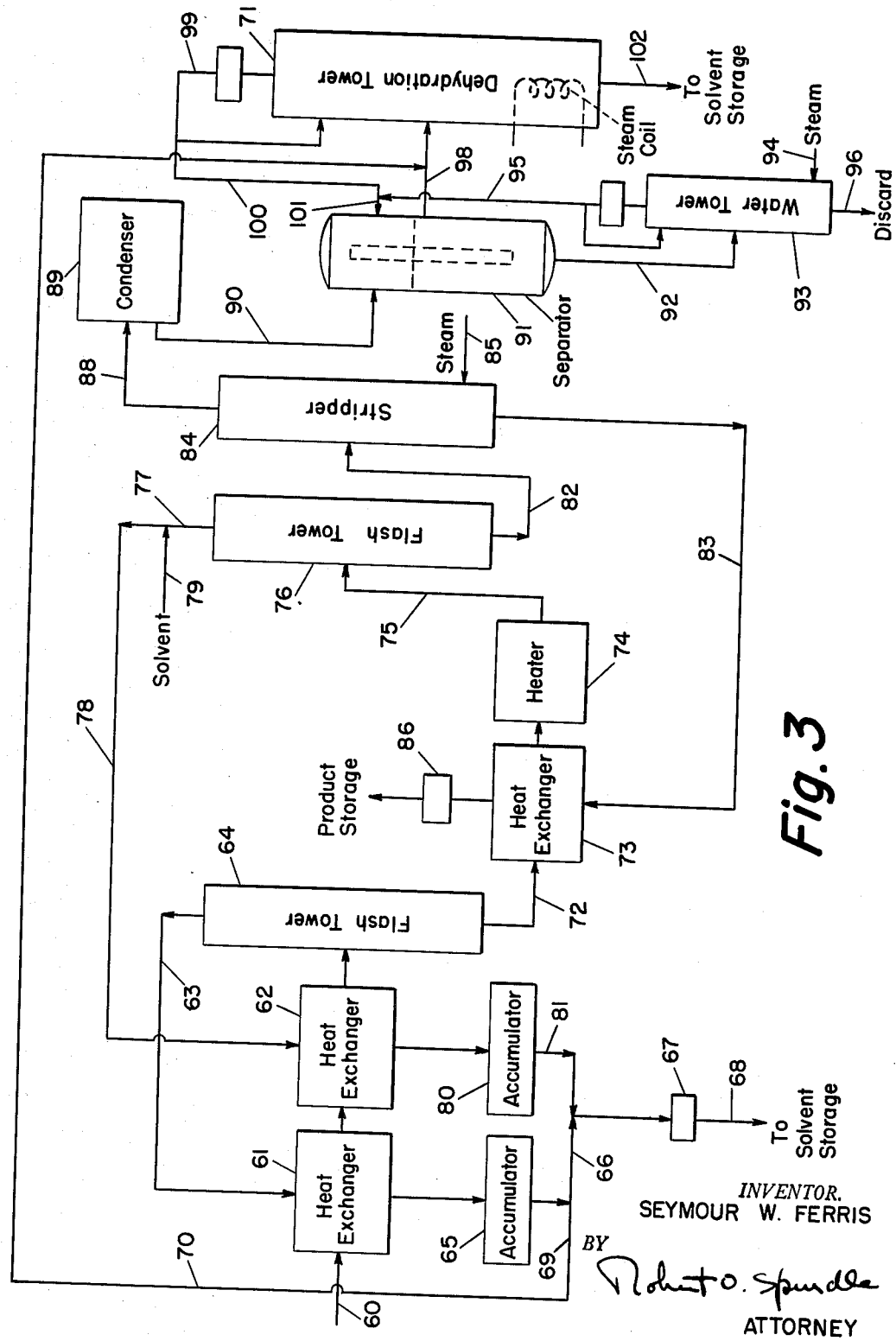

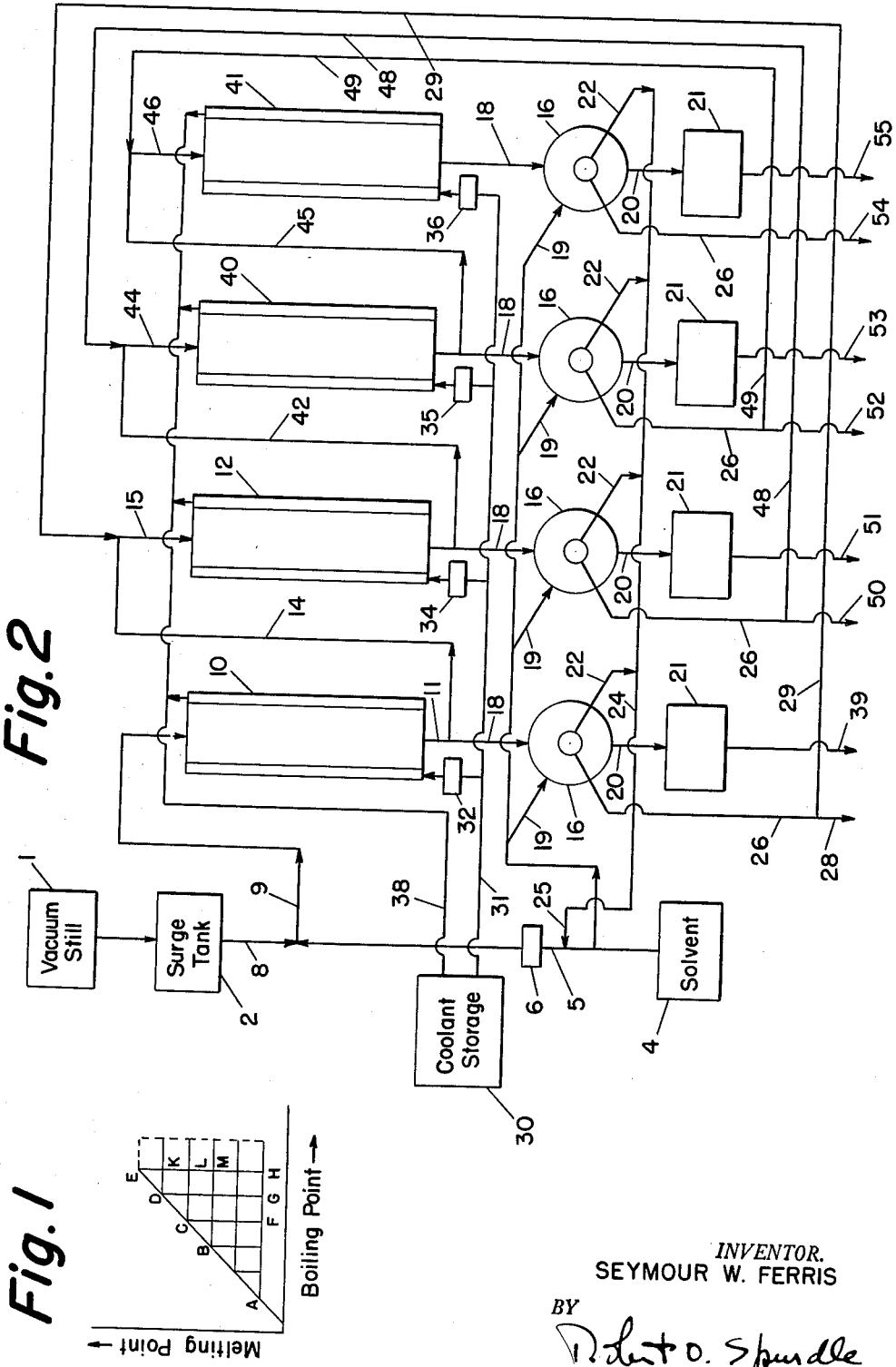

Jan. 10, 1956

S. W. FERRIS 2,730,476

LAMINATED SHEET MATERIAL

Filed May 19, 1953

2 Sheets-Sheet 2

INVENTOR.
SEYMOUR W. FERRIS

BY Robert O. Spindle

ATTORNEY

United States Patent Office 2,730,476
Patented Jan. 10, 1956

2,730,476

LAMINATED SHEET MATERIAL

Seymour W. Ferris, Mount Holly, N. J., assignor to Sun Oil Company, Philadelphia, Pa., a corporation of New Jersey Application May 19, 1953, Serial No. 356,038

6 Claims. (Cl. 154—50)

This invention relates to a process for the preparation of waxes. More particularly, the invention relates to a process for the preparation of a wax or a series of waxes having special predetermined properties, and to laminated products prepared with a wax thereby produced.

The preparation of waxes has heretofore generally been performed as subsidiary to the preparation of lubricating oils. The usual process is to separate a paraffin distillate into oil and a solid wax fraction by chilling and filter-pressing. The so-obtained slack wax contains about 45% oil, and generally is sweated to remove a major portion of this oil to form the regular paraffin of commerce. Such wax may be further refined, such as by decolorization with activated clay. Fractional precipitation to obtain relatively high melting waxes is also known. These waxes have widely varying properties because the process of preparation provides practically no control thereover. Accordingly, to obtain a wax having special properties, it has heretofore been a general practice to subject a wax, prepared as above described, to a further series of operations.

It has been found that by employing a novel combination of steps embodying certain novel features, as hereinafter fully described, a wax or a plurality of waxes may be prepared, each of which has predetermined properties, such as melting point, adhesiveness, hardness, brittleness, softness, ductileness, and the like. The so-formed waxes may be blended to yield other waxes having special characteristics, as hereinafter more fully described.

Figure 1 shows a boiling point versus melting point diagram of wax found in petroleum. The area under line ABCDE, and above line AFGH, represents the wax found in petroleum. Below line AFGH is lubricating oil. In general, the waxes prepared by prior processes cover substantially the entire stated wax area. Such a wax may be distilled to produce a product within the area, e. g., CDGF, or fractional precipitation may be employed to obtain a wax within the area, e. g., BCLM. Such preparations require, in addition to the process of preparation of the initial wax, the additional processes indicated.

The present invention provides a flexible process by which a wax represented by any square of the diagram, or by a triangle immediately under line ABCDE, or a series of waxes so represented, may be prepared directly from slack wax in a rapid and economically feasible process. Accordingly, by operation in accordance with the present invention, a wax having the properties of a given area or areas within the diagram may be prepared, and will have the special properties of such area. Thus, a wax within the triangle under line CD will be hard, while waxes within the three squares thereunder will be, respectively, tough, adhesive, and soft. It is known that paraffin waxes contain both straight-chain hydrocarbons and branched-chain hydrocarbons, and that the branched-chain hydrocarbons have a much lower melting point for a given boiling point than the straight-chain hydrocarbons. ("Commercial Waxes" by H. Bennett, 1944, Chemical Publishing Co., pages 13 and 14.) Accordingly, waxes with hydrocarbon components falling along line ABCDE, such as the triangle under line CD, contain a substantial amount of straight-chain hydrocarbons, while the waxes within the three squares thereunder are substantially free from straight-chain hydrocarbons. Waxes free from straight-chain hydrocarbons are thus adhesive and soft, and are especially suitable for laminating and coating fibrous materials such as papers, as hereinafter demonstrated.

In accordance with the present invention, a slack wax having from about 20% to about 50% oil is subjected to vacuum distillation to form a plurality of fractions. A selected fraction thereof is admixed with and dissolved in a solvent having preferential solvent power for the oil. Preferably the solvent is admixed while hot, and more preferably the wax and solvent are admixed while both are hot. The resulting solution is passed through a cooler, or preferably a series of coolers, to lower the temperature of the solution to a predetermined value whereby wax insoluble in the solvent at such temperature, relatively high melting wax, is precipitated. The precipitated wax is filtered from the solution and the filtrate may be passed through a further cooler or series of coolers. When a further and lower predetermined temperature is reached, wax insoluble in the solvent at such temperature, relatively lower melting wax, is precipitated and is filtered. Usually the second and lower temperature is from about 15° F. to about 70° F. lower than the temperature of the first precipitation. The filtrate from this second filtration may be further treated in like manner to the extent desired to form a plurality of precipitates. By the terms "relatively high melting wax," and "relatively lower melting wax," is meant the waxes melting in the upper and successively lower ranges, respectively, of the wax fraction in question.

Filtration is advantageously accomplished by means of a rotary vacuum filter having provision for both supplying wash liquid to the filtered wax and subsequent drying by suction. Separate continuous take-offs for the washed wax cake, used wash, and filtrate are provided. The fresh wash liquid is advantageously of the same composition as the solvent employed for dissolution of the wax.

The solvent employed should have a preferential solvent power for the oil contained in slack wax, should dissolve the wax at relatively high temperatures, and precipitate wax at lower temperatures. A mixture of methyl ethyl ketone and benzene in approximately equal parts by volume, is the preferred solvent, but either of these components may be replaced, in whole or in part, by other ketones such as methyl butyl ketone or acetone, or hydrocarbons and halogenated hydrocarbons such as ethylene dichloride, pentane and hexane, or alcohols such as propyl or the heptyl alcohols.

The wax precipitates obtained as above described, after solvent and wash liquid removal, have the properties of an area or areas as described in conjunction with Figure 1, depending on the fraction from the vacuum distillation employed and the temperature range of the precipitation. Solvent removal from the wax, however, is important and may affect the final properties of the wax, and hence solvent removal and recovery forms an important phase of the present invention, as hereinafter described. Since the wash liquid and solvent are of the same composition, the description of solvent removal and recovery is intended to include the removal and recovery of wash liquid remaining on the wax precipitate.

Wax in the form of a slurry with solvent, the used wash liquor, and the final filtrate are separately treated to recover solvent. This is accomplished by distillation, preferably by introduction into a flash tower wherein a major portion of the solvent is removed by flash vaporization and returned to solvent storage. Advantageously, a plurality of flash towers, preferably two, are employed with the second flash tower operating at a higher pressure and temperature than the first in order to insure substantial removal of the solvent from the wax cake or filtrate, and to gain advantages of heat exchange, as described hereinafter. The residue from the final flash tower is introduced into a steam stripper wherein it is contacted with live steam at a temperature substantially above the boiling point of the solvent at the pressure employed, which removes remaining solvent from the wax. The wax from the steam stripper is cooled by appropriate heat exchange and is passed to product storage. The present system of solvent removal has no adverse effects on the wax products, such as decomposition, and the so-formed wax product may be subjected to a further refining operation, such as decolorization, if necessary or desirable. Thus, molten wax products may be percolated through any suitable decolorizing material such as activated carbon or activated clay, or it may be admixed therewith and subsequently filtered. When solvent is recovered from a filtrate, wax and/or oil dissolved therein is obtained in like manner, and may be recovered as a product, or may be recycled through a subsequent process.

As above described, slack wax is subjected to vacuum distillation to form a plurality of fractions, and a desired fraction or fractions treated in the present process. It is preferred to obtain fractions of a boiling range so that 70% thereof distills within a range of 150° F. at 2 mm. of mercury pressure. Wax fractions within this range have well defined desired properties which make them valuable for the uses intended. However, where a residual fraction is employed, a portion thereof may boil at high temperatures outside of the stated range, and good results with such residual fractions are obtained in the present process.

Also, as above described, wax solution is passed through a cooler, or a series of coolers to precipitate wax therefrom. The coolers advantageously consists of concentric pipes, with the wax solution passing through the center pipe and the heat exchange material passing through the outer pipe. The inner pipe is provided with helical scrapers for removing precipitated wax from the surface of the exchanger. A feature of the present process is the use, as the heat exchange material, of a liquid which takes up only sensible heat in the process, such as kerosene, a gas oil, or other low melting organic material which is substantially non-viscous at the temperature employed, and that such coolant be passed through the exchanger countercurrent to the wax-bearing solvent. It has been found that the use of coolants heretofore employed which take up latent heat of vaporation, such as ammonia, sulfur dioxide, dichlorodifluoromethane, and the like, may result in the formation of difficultly filterable crystals. While it is not desired to be limited to theoretical considerations, it is believed this is due to the fact that the coolants heretofore employed maintain the coolant side of the exchangers at approximately the same temperature throughout their length, whereas the present coolants, especially when employed in countercurrent flow, provide for a gradual lowering of the temperature of the wax bearing solvent throughout the length of each exchanger. This gradual temperature lowering causes slower crystallization of the wax and results in the formation of large, readily filterable, crystals. The use of water or aqueous solutions as the coolant is practically undesirable, because of the corrosion encountered and the desirability of using a single coolant for all chillers. For example, brine is unsuitable since at the lower temperatures employed salt may deposit on the walls of the brine cooler thereby destroying the necessary heat transfer, and since brine would cause corrosion throughout the entire brine system, thus causing additional loss of heat transfer throughout the system. In order to form readily filterable crystals, it is preferred that the temperature of the inflowing wax-bearing solvent should not be more than 60° F., and preferably not more than 30° F., higher than the temperature of the outflowing coolant. The temperature differential of the solvent and coolant flowing past adjacent points within the exchangers should be within these stated limits. In some instances, it may be desirable to precipitate wax in a less filterable form in order to synchronize production operations, in which case shock chilling, i. e., rapid chilling using temperature differentials greater than above defined, may be employed.

As stated, a selected fraction from the vacuum distillation is preferably admixed with a heated solvent. This procedure results in unobvious advantages over the prior art processes involving admixing wax with cold solvent, and then heating the mixture to cause solution of the wax in the solvent. Thus, it has been found that by admixing wax with hot solvent, the temperature of which is substantially above the solidification point of the wax charge, dissolution of the wax in the solvent occurs at a substantially lower temperature than when heat is supplied to a mixture of the components initially contacted at a temperature below that required for dissolution. Preferably, the temperature of the solvent at the time of mixing is from 10–25° F. above the solidification point of the wax. Also, it is further preferred to mix the hot solvent with hot wax, which may advantageously be accomplished soon after the vacuum distillation step. A further advantage is the rapidity with which dissolution occurs when employing this feature of the present process which is in contrast with the relatively high temperatures, long contact times and vigorous agitation heretofore required.

In order to illustrate a preferred embodiment of the present invention, attention is directed to the accompanying flow diagrams of which Figure 2 illustrates the present process through the filtration operation, and Fig. 3 illustrates the process following filtration, namely the solvent recovery operation, including wax purification. Referring now to Figure 2, numeral 1 represents a vacuum still wherein slack wax is separated into the desired fractions. A fraction selected to illustrate the process is passed into surge tank 2, the other fractions being introduced into similar systems operating simultaneously, or to storage for later production. Solvent from storage tank 4 is passed through line 5 and heater 6 to admix with and dissolve the slack wax, which leaves surge tank 2 through line 8. The wax in molten form at a predetermined temperature, depending on the fraction employed, is admixed with the solvent heated to at least 10° F. above the solidification point of the wax. The ratio of solvent to wax charge may vary from 1:1 to 20:1, and preferably is from 2:1 to 12:1. Mixing and dissolution occur in line 9, but a special mixing vessel (not shown) may be provided if desired. The wax-bearing solvent passes through line 9 into cooler 10. The cooler is advantageously composed of concentric pipes; the wax-bearing solvent passing through the central pipe, the surface of which is continuously scraped by a rotating helical scraper. The cooler represented by 10 may consist of a plurality of such coolers. Solvent containing precipitated wax leaves cooler 10 through line 11 and is passed to cooler 12 through lines 14 and 15. In cooler 12, the temperature of the solvent is further reduced to a desired value and a further quantity of wax precipitated therefrom. This process may be continued until the desired temperature is reached. If a desired temperature is reached in the cooler represented by 10, the wax bearing solvent therefrom is passed to continuous filter 16 through line 18. Wash liquid for the filter cake is introduced through line 19 and is advantageously of the same composition as the solvent employed. Preferably the ratio of wash to filtered wax is from 1:1 to 10:1. Used wash containing oil from the wax cake is continuously removed from the filter through line 22 and is returned to the solvent main through lines 24 and 25 to a point intermediate the wash takeoff and the solvent heater 6. Filtrate from filter 16 is removed through line 26 and is passed to solvent recovery through line 28, or is passed to a subsequent cooler through lines 29 and 15, and the cooling and filtration process repeated. Wax is removed from the filter through line 20 and passes to receiving vessel 21. Thereafter, the wax passes through line 39 to the solvent recovery step. In repeating the process through subsequent coolers and filters using a desired succession of steps, 40 and 41 represent coolers equivalent to 10 and 12, and lines 42 and 44, and 45 and 46, represent feed lines thereto, respectively, whereby wax-bearing solvent is passed to these coolers without an intermediate filtration step. Line 48 permits passage of filtrate from filtration step following cooler 12 to subsequent cooler 40, and line 49 permits passage of filtrate from filtration step following cooler 40 to subsequent cooler 41. The filters following coolers 12, 40, and 41 have the same parts and functions as the filter following cooler 10, and bear the same numerals for corresponding parts. Lines 28, 39, and 50 through 55 represent wax or filtrate passing to the solvent recovery step, which step is illustrated in Figure 3.

Referring now to Fig. 3, both the wax and the filtrate from the filtration operation represented in Fig. 2 by lines 28, 39, and 50 through 55, are passed to separate solvent recovery systems as shown in the diagram, or are separately passed into the same system. For example, wax from filter 16 is passed from vessel 21 through line 39 of Fig. 2, and into and through line 60 of Fig. 3, it being understood that each of the wax precipitates are so treated, as is each of the filtrates, unless further cooled, in which case the filtrate from the final filtration is so treated. The wax passes through heat exchangers 61 and 62, through flash tower 64 operated preferably at a relatively low pressure, say from about 5 to 10 p. s. i. g., and a temperature of about 10° F. to about 30° F. above the boiling point of the solvent; a temperature of about 200° F. is usually suitable for the preferred solvent of the present process. A substantial portion of the solvent accompanying the wax is removed by this tower. Effluent solvent is passed by line 63 through heat exchanger 61 to accumulator 65, from whence the solvent is passed through line 66 to cooler 67, and then to the solvent storage through line 68. Alternatively, the solvent and any water, in whole or in part, may be passed from accumulator 65 through lines 69, 70 and 98 to dehydration tower 71, where the water is removed. The wax leaves flash tower 64 through line 72 and passes through heat exchanger 73, a heater 74, and then through line 75 to flash tower 76 operated at a higher temperature and pressure than flash tower 64, say a pressure of from about 25 to about 30 p. s. i. g., and a temperature of about 150° F. to about 300° F. above the boiling point of the solvent; a temperature of about 400° F. is usually suitable for the preferred solvent of the present process. Effluent solvent from flash tower 76 is passed through lines 77 and 78 and through heat exchanger 62. In order to regulate the temperature of solvent to heat exchanger 62, solvent at a desired temperature may be added to the vapor system, such as to line 77 or 78, through line 79. From heat exchanger 62 solvent passes to accumulator 80, and from accumulator 80 through line 81, cooler 67 and line 68 to solvent storage. Wax leaves flash tower 76 through line 82 and enters stripper 84 wherein it is contacted with live steam introduced through line 85, which removes remaining traces of solvent from the wax. From stripper 84, wax passes through line 83, through heat exchanger 73, cooler 86, and then to product storage. Effluent from the stripper 84 passes through line 88 to condenser 89 wherein steam and any solvent remaining therewith is condensed. The water and solvent are then passed through line 90 into separator 91, wherein the two phases are allowed to separate. The water layer is removed through line 92 and passed into water tower 93 wherein it is contacted with live steam introduced through line 94. The overhead from the water tower is returned to the separator 91 through lines 95 and 101, and the residue removed through line 96 is discarded. The solvent layer from separator 91 is passed through line 98 into dehydration tower 71. The last traces of moisture are removed from solvent in this dehydration tower, and the solvent is passed therefrom to storage through line 102. Overhead from this tower is returned to separator 91 through lines 99, 100 and 101.

When operating in accordance with the process of the present invention, it has been found that in some instances the slurry formed by the wax precipitated in a cooler is too thick to achieve rapid and efficient filtration. In such case, it is advantageous to dilute such slurry with solvent, and preferably with used wash liquor from the same or another filtration step. It has been found that the employment of used wash liquor for dilution of the slurry accomplishes the desired object without dissolving any substantial amount of the precipitated wax whereby a high yield, together with rapid and efficient filtration, is obtained. This used wash liquor should contain at least about 0.1% of dissolved wax, and preferably contains at least 1% of dissolved wax; more preferably, the used wash liquor contains sufficient wax to be saturated at the temperature of the subsequent filtration. The ratio of solvent or used wash to slurry will vary, but is advantageously maintained between 1:1 and 12:1.

The wax products prepared in accordance with the present process generally contain only a relatively small amount of oil, and this small amount does not adversely affect the properties of the waxes in most of their applications. The amount of oil can be held to a small value by use of a relatively large proportion of wash liquor. However, when it is desired to substantially completely de-oil the wax, the wax filter cake from the desired filtration step may be repulped with solvent and refiltered. It has been found that by employing used wash liquor instead of fresh solvent for repulping, substantially all of the oil is removed, and substantially none of the wax product is dissolved. Employing used wash liquor in this manner, it is unnecessary to dissolve the wax in the solvent by heating a mixture thereof, which requires cooling to reprecipitate the wax and subsequent filtration. The concentration of wax in the used wash liquor is advantageously the same as that employed for slurry dilution, as above described. The ratio of solvent or used wash to precipitated wax is preferably maintained between 1:1 to 12:1.

The separator employed to separate solvent from water, which liquids are immiscible, is illustrated in Figure 3 by numeral 91, and is advantageously designed for continuous operation. Preferably the separator is a decanter comprising an elongated closed vessel, vertically mounted, and divided into an upper and a lower compartment by a partitioning plate located approximately at the center of the vessel. A vertical pipe is positioned through the barrier providing communication between the two compartments, the upper open end of the pipe being positioned in the upper portion of the upper compartment, and the lower open end of the pipe being positioned a point substantially midway between the partitioning plate and the bottom of the vessel. The mentioned pipe is apertured immediately above the plate permitting a flow of liquid from the upper into the lower compartment. Incoming feed is introduced into the upper compartment of the vessel and flows through the apertures, down the pipe, and into the lower compartment, where the two layers separate. The solvent layer is removed from the lower compartment of the vessel at a point above the liquid interface, and the water layer is removed from the bottom of the lower compartment or from the side thereof adjacent the bottom, which of course is below the liquid interface. From the foregoing description it will be apparent that a surge of feed will cause the upper compartment to become relatively full, but that the feed will run through the apertures in a controlled manner into the pipe and then into the lower compartment. In this manner, such surge will not destroy the interface between the liquid phases. The open upper end of the pipe provides a relief in the event that a surge is sufficient to exceed the capacity of the apparatus. It is advantageous to maintain the rates of flow from the outlets of the lower compartments so that the liquid interface is maintained at substantially the level of the open lower end of the pipe, so that it is unnecessary for one phase to pass through any substantial portion of the other phase in the separation thereof. This decanter is described and claimed in copending application Serial No. 135,588, filed December 29, 1949.

The following example illustrates preferred embodiments of the present invention, which is not to be considered as limited thereby:

*Example*

Employing the process and apparatus substantially as described in connection with Figures 2 and 3, a variety of wax products were prepared which illustrate the process of the present invention.

Slack wax containing about 30% oil, obtained as a by-product from a process for the de-waxing of lubricating oils, was continuously introduced at about 650° F. into a vacuum still at a rate of 2,000 barrels per day. The wax was separated into two fractions, one being removed at an average temperature of about 420° F. and 6 mm. of mercury and the other at about 590° F. and 25 mm. of mercury. The low boiling fraction constituted 68% of the total charge, and 70% thereof distilled between about 390° F. and 490° F. at 2 mm. of mercury pressure. The high boiling residual fraction constituted 32% of the total charge, and 30% thereof distilled between about 585° F. and 638° F. at 2 mm. of mercury pressure. Six wax products were prepared from these fractions, as described below.

The low boiling fraction was dissolved in 3.5 parts of solvent per part of wax charged (hereinafter, "parts" is based on a unit quantity of this wax charged in a given operation, unless otherwise stated). The solvent consisted of 55% by volume methyl ethyl ketone and 45% by volume benzene, and was heated to 150° F. prior to the dissolution. The resulting solution was passed through a series of coolers consisting of concentric pipes; the wax solution passing through the center pipe, and kerosene, employed as the heat exchange material, passing in opposite direction in the outer pipe. Helical scrapers were provided for removing precipitated wax from the surface of the exchanger. A temperature differential of about 30° F. to 60° F. was maintained at adjacent points throughout the heat exchangers.

When the temperature of the solution had been reduced to 84° F., a substantial amount of wax had precipitated to form a slurry. The slurry was diluted with 1.5 parts of solvent and the diluted slurry filtered at 84° F. on a rotary vacuum filter. The filtered wax cake was washed with 1.5 parts of solvent. The filtered wax was repulped with 2 parts of fresh solvent, and the so-produced slurry re-filtered and washed with 1.5 parts of solvent. The wax recovered was subjected to solvent removal, as hereinafter described; the wax product finally obtained is designated herein as "high-melt paraffin," the properties thereof being tabulated in the following table. The wax yield was 12%, based on the entire low boiling wax charge.

The filtrate from the first filter operation was passed to a further series of coolers, operated as above described, and cooled to a temperature of 31° F. The above described process of filtering, repulping, and refiltering, including washing, was substantially duplicated, the slurry being diluted with 10 parts of solvent prior to filtration, and the filtered wax washed with 3 parts of solvent. Repulping was with 4 parts of solvent. The final wax product, designated herein as "milk container wax," had the properties listed in the table below. The wax yield was 44%, based on the entire low boiling charge.

The high boiling fraction was dissolved in a heated solvent consisting of 53% methyl ethyl ketone and 47% benzene. The resulting solution was divided into two portions, and each portion separately treated as described for the 420° F. fraction, except as follows:

One portion of the solution was cooled to 61° F., diluted with 5.8 parts of solvent, filtered and washed with 4 parts of solvent. The final wax product, after solvent removal, is herein designated as "insulating wax." A yield of 29%, based on the total high boiling charge, was obtained. The filtrate from the initial filtration was further cooled to 41° F., diluted to 10 parts of solvent, filtered, and washed with 2.3 parts of solvent. After solvent removal, the final wax product obtained is herein designated as "cosmetic wax." A yield of 16%, based on the total high boiling charge, was obtained.

The other portion of the wax solution was cooled to 93° F., diluted with 5.5 parts of solvent, filtered, and washed with 4 parts of solvent. The wax product obtained, after solvent removal, is herein designated as "polish wax." A yield of about 13%, based on the total high boiling charge, was obtained. The filtrate from the initial filtration was further cooled to 58° F., diluted with 6 parts of solvent, filtered, and washed with 4 parts of solvent. The wax product finally obtained, after solvent removal, is designated herein as "laminating wax." A yield of 26%, based on the total high boiling charge, was obtained.

Solvent was removed from each of the waxes obtained by the final filtration operations, as above-described, as follows:

The separated wax was passed through suitable heat exchangers and thereafter to a flash tower operated at 200° F. and 8 p. s. i. g., and subsequently to a second flash tower operated at 420° F. and 28 p. s. i. g. The resulting wax, still containing a small amount of solvent, was passed to a steam stripper operated at 400° F. wherein the final traces of solvent were removed. The resulting wax product passed to storage. The solvent recovered is returned to the process.

The waxes prepared as above-described have the properties listed in the following table:

| Wax Product | Melting Point (° F.) | Viscosity (Saybolt Universal at 210° F.) | Penetration [3] (77° F.) | Description |
| --- | --- | --- | --- | --- |
| High-melt paraffin | [1] 151 | 43 | 12 | hard and non-blocking. |
| Milk-container | [1] 130 | 40 | 22 | ductile and tough. |
| Insulating | [2] 178 | 85 | 11 | hard and tough. |
| Cosmetic | [2] 115 | 88 | 40 | soft and adhesive. |
| Polish | [2] 192 | 90 | 5 | very hard and non-blocking. |
| Laminating | [2] 140 | 87 | 22 | flexible and adhesive. |

[1] A. S. T. M. method D87-42.
[2] A. S. T. M. method D127-30.
[3] A. S. T. M. method D5-25.

The names employed to designate the wax products are indicative of their applications. High-melt paraffin wax is especially useful in the paper industry because of its anti-blocking properties; milk container wax is especially useful for coating milk cartons, since the coating is waterproof and does not break on bending at low temperatures; insulating wax is especially useful in the preparation of electrical devices because of its dielectric properties, and also finds applications in the paper industry as an anti-blocking agent added to other waxes, and as an extender for wax polishes; cosmetic, polish and laminating waxes are especially useful as indicated by their names, e. g., laminating wax is employed for bonding sheets of paper, and cosmetic wax is employed in the preparation of cosmetics, and also has properties which render it desirable for uses at low temperatures, such as on wrappers for frozen foods. As above explained, the waxes first precipitated from a given fraction contain the straight-chain hydrocarbons of the fraction and in addition some non-straight chain paraffins. These waxes are relatively hard and non-blocking, and in the foregoing table, are the high-melt paraffin, insulating and polish waxes. On the other hand, the waxes prepared after removal of substantially all of the straight-chain hydrocarbons are generally flexible and adhesive, as shown by the laminating wax of the foregoing table. It will also be appreciated that the waxes prepared from the distillate fraction are paraffin waxes whereas the waxes prepared from the relatively high boiling, or residual, fraction are microcrystalline waxes ("The Chemistry and Technology of Waxes" by Albin H. Warth, 1947, Reinhold Publishing Corporation, pages 216 and 217).

In accordance with the process, other waxes having predetermined properties may be prepared. Also, the wax products may be blended to secure a desired combination of properties.

In order to demonstrate the value and unobvious properties of waxes which can be prepared in the present process, laminating wax, prepared and having the properties as above described, was tested for adhesion in the preparation of laminated sheet materials. For comparison, the high-melt paraffin wax, above described, and commercially available waxes were also tested. The adhesion tests were performed as follows: Two strips of glassine paper, 2 inches by 6 inches, were laminated with the wax under test by pressing them mildly on a hot plate at a temperature just above the melting point of the wax. The load was adjusted to about 8 pounds of wax per ream of laminate, evenly distributed between the strips, and since the wax is homogeneous, it is not difficult to secure an even distribution. This laminate was held at 73° F. in an atmosphere of 50% relative humidity for one hour before testing. Adhesion is the grams pull per 2 inch width required to separate the strips by peeling.

Many samples of the laminating wax of the present invention, selected from different batches, were tested. Typical data, in grams pull per two inch width, were as follows: 89, 89, 86, 84, 74, 99, and 117. In general, the adhesion varies from 80 to 90, but may vary from 70 to 120. The adhesion value for high-melt paraffin wax prepared as above described, was 6 as determined by the same test. For further comparison, commercially available microcrystalline waxes were tested for adhesion as above described. The data obtained and the melting points of the waxes were as follows (adhesion recorded as above; grams pull per two inch width):

|  | Wax A | Wax B | Wax C | Wax D |
|---|---|---|---|---|
| melting point (° F.) | 141 | 143 | 160 | 151 |
| adhesion | 37 | 19 | 14 | 45 |

The laminating wax may be employed for binding sheets of fibrous materials, such as paper, paper board and regenerated cellulose, to form a sheet material, such as a container wall, consisting of two sheets of material adhered together by a film of wax intercalated therebetween. The wax may also be used for coating a base sheet material, particularly with a superficial film of wax, to provide a moisture and moisture vapor barrier such as for containers for packaging foods.

This application is a continuation-in-part of copending application Serial No. 135,008, filed December 24, 1949.

The invention claimed is:

1. A sheet material comprising a base sheet and a superficial film of a wax, said wax film consisting of a wax substantially free from normal paraffins.

2. A container wall comprising at least two sheets of material adhered together by a film of wax intercalated therebetween, which wax is substantially free from normal paraffins.

3. A laminated sheet material comprising at least two sheets of regenerated cellulose adhered together by a film of wax substantially free from normal paraffins.

4. A container wall comprising a base sheet having superficial wax film thereon, said wax film comprising a homogeneous wax which is substantially free from normal paraffin.

5. A sheet material comprising a base sheet having superficial wax film thereon, said wax film comprising a homogeneous wax which is substantially free from normal paraffin.

6. A sheet material comprising a base sheet and a superficial film of a wax, said wax film comprising a microcrystalline wax substantially free from normal paraffins.

References Cited in the file of this patent

UNITED STATES PATENTS 2,599,130   Rumberger et al. _____ June 3, 1952